United States Patent
Bérubé

(10) Patent No.: US 6,318,794 B1
(45) Date of Patent: Nov. 20, 2001

(54) FLOORING PANEL FOR A TRANSPORT VEHICLE

(75) Inventor: Jacques Bérubé, Quebec City (CA)

(73) Assignee: Planchers Leclair Inc., Quebec (CA)

( * ) Notice: Subject to any disclaimer, the term of this patent is extended or adjusted under 35 U.S.C. 154(b) by 0 days.

(21) Appl. No.: 09/335,496

(22) Filed: Jun. 18, 1999

(51) Int. Cl.⁷ ................................................ B32B 21/08
(52) U.S. Cl. ............................ 296/182; 428/46; 428/55; 52/309.15; 52/392
(58) Field of Search .................................. 296/181, 182, 296/183, 204; 428/46, 55; 52/309.1, 309.15, 390, 391, 392

(56) References Cited

U.S. PATENT DOCUMENTS

| | | | |
|---|---|---|---|
| 1,487,255 | * 3/1924 | Magelssen | 428/55 |
| 5,236,754 | * 8/1993 | McBride et al. | 428/55 |
| 5,928,735 | 7/1999 | Padmanabhan et al. | 428/33 |
| 6,179,942 | * 1/2001 | Padmanabhan et al. | 428/33 |
| 6,183,824 | * 2/2001 | Padmanabhan et al. | 428/33 |

OTHER PUBLICATIONS

Chemcraft International Inc homepage, www.chemcraft.com, copyright 1998.*
Resin Systems Inc. homepage, www.resinsysteminc.com, copyright 1999.*

* cited by examiner

Primary Examiner—Stephen T. Gordon
Assistant Examiner—Patricia Engle
(74) Attorney, Agent, or Firm—Katten Muchin Zavis

(57) ABSTRACT

Disclosed herein is a flooring panel for a transport vehicle, comprising a wood core, the wood core including a plurality of wooden strip elements bonded together and having a bottom surface, and a reinforced composite layer applied to the bottom surface.

19 Claims, 3 Drawing Sheets

FLOORING PANEL FOR A TRANSPORT VEHICLE

BACKGROUND OF THE INVENTION

1. Field of the Invention

The present invention relates to transport vehicles, more particularly but not necessarily exclusively to tractor trailer vehicles, and more particularly to flooring used in transport vehicles.

2. Description of the Related Art

A tractor trailer vehicle has a tractor which pulls what is widely referred to as a semi-trailer and generally includes covered vans and open flat-deck semi-trailers. These semi-trailers commonly have a payload-receiving deck, which is constructed with flooring which is formed from a hardwood laminate. A typical semi-trailer has a deck with a surface area of about 480 square feet and usually the flooring weighs about 5.5 pounds per square foot. This means that nearly 2200 pounds of the semi-trailer's 'deadweight' is the flooring. It follows that the greater the deadweight of the flooring, the higher the operating cost of the vehicle. Most highways have strict weight restrictions per axle and the higher the deadweight, the lower the payload that can be hauled in the semi-trailer.

Conventional laminate flooring is usually made from oak or other hardwoods with a density similar to oak. The laminate flooring is expected to last only about 7 to 10 years, because of the effects of wear and tear on the flooring, and exposure to the extreme temperature swings and precipitation of the changing seasons. Water penetrates the flooring causing both an increase in the deadweight, an inevitable accelerated degradation of the flooring due to rot, and a loss in strength due to the damaging effect of water along the bonding lines of the laminate, causing a resulting loss of adhesion. In fact, the presence of water in the laminate can be expected to reduce the strength of the laminate by as much as 75% of its original strength.

It is therefore an object of the present invention to provide an improved flooring for use in the decks of semi-trailers or other transport vehicles.

SUMMARY OF THE INVENTION

In one of its aspects, the present invention involves a semi-trailer flooring panel comprising a wood core, the wood core including a plurality of strip elements, wherein the wood core has a bottom surface, and a reinforced composite layer is applied to the bottom surface.

Preferably, the strip elements are made from selected hardwoods or softwoods, such as aspen, maple or birch hardwoods and some selected softwoods such as northern black spruce and northern white spruce which have suitable mechanical characteristics including one or more of specific density, tension strength, shear strength and torsional stiffness. Preferably, the semi-trailer flooring panel meets the specifications established by PULLMAN TRAILMOBILE and included herein as Appendix One.

Preferably, substantially the entire area of the bottom surface is continuously bonded to the composite layer. In one embodiment the reinforced composite layer has a plurality of reinforcing elements which are arranged substantially parallel with the bottom surface, preferably embedded in an adhesive matrix. Still more preferably, the matrix includes a resilient material in a granulated form, such as a granulated synthetic rubber. The reinforcing elements are preferably fibreglass strands and more preferably in a woven fibreglass sheet.

Preferably, each of said strip elements has a specific density, or an average specific density, ranging from about 0.35 to about 0.65, more preferably from about 0.40 to 0.59. Desirably, strip elements may be used in some cases where the specific density does not exceed 0.59.

In one embodiment, the panel has a thickness which does not exceed about 1 1/16 inch, although other thickness are also contemplated.

A protective coating may be applied to the wood core. In one embodiment, the protective coating envelopes the wood core together with the layer and preferably includes polyurethane materials and may include granular materials and the like to provide a roughened 'anti-slip' outer surface.

Preferably, the flooring panel has edge regions which are formed to establish a joint with at least one adjacent flooring panel. More preferably, the edge region is provided with a compressible portion in order to render the so-formed joint substantially watertight. Still more preferably, the edge regions include a first relatively large projection and the compressible portion includes a second relatively small projection. In one embodiment, the first and second projections are offset relative to one another.

In another of its aspects, the present invention provides a semi-trailer having a payload-receiving deck formed with a plurality of flooring panels, each of the flooring panels including a wood core, the wood core including a plurality of strip elements bonded together and having a bottom surface, and a reinforced composite layer applied to the bottom surface.

In still another of its aspects, the present invention provides a transport vehicle having a payload-receiving deck including at least one flooring panel, the flooring panel including a wood core, the wood core including a plurality of strip elements bonded together and having a bottom surface, and a reinforced composite layer applied to the bottom surface.

In another of its aspects, the present invention provides a method of forming a flooring panel for a transport vehicle, comprising the steps of:

a) fusing a plurality of wooden strip elements to form a wood core with a lower surface;

b) applying a first adhesive layer to said bottom surface;

c) applying a layer of reinforced material on said layer of adhesive material; and d) applying a second adhesive layer to said reinforced material Preferably, the first and second adhesive layers are 'wet' and include an isocyanate constituent. In this context, the term 'wet' is intended to mean in a liquid form with a capacity to penetrate both the substrate of the wood core and the inner spaces or voids of the reinforcing material. More preferably, the method includes, following step d), the step of:

e) enveloping the wood core with a protective layer

If desired, the protective layer may include a polyurethane constituent as well as a hardening constituent to harden the upper surface.

BRIEF DESCRIPTION OF THE DRAWINGS

Several preferred embodiments of the present invention will be provided, by way of example only, with reference to the appended drawings, wherein.

DESCRIPTION OF THE PREFERRED EMBODIMENTS

Figure 1:
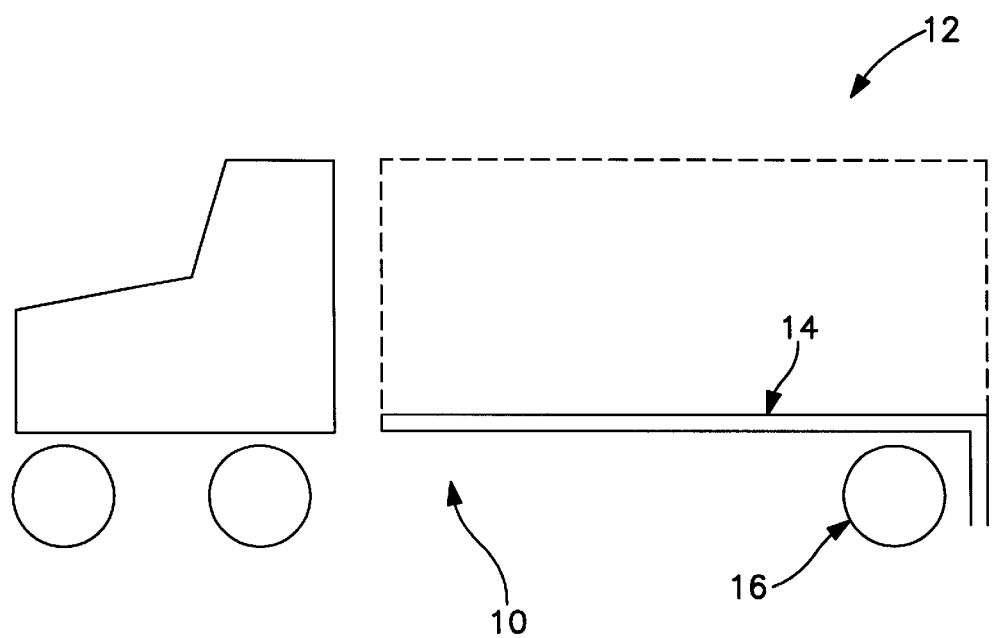
FIG. 1 is a schematic side view of a tractor trailer vehicle.

FIG. 1 shows a tractor trailer vehicle 10 having a tractor and a semi-trailer, the latter identified at 12. The semi-trailer has a payload-receiving deck 14 supported on an undercarriage shown schematically at 16. The semi-trailer 12 is intended to include semi-trailers with covers, as shown in dashed lines, and those without, as well as other semi-trailers which use a payload-receiving deck.

Figure 2:
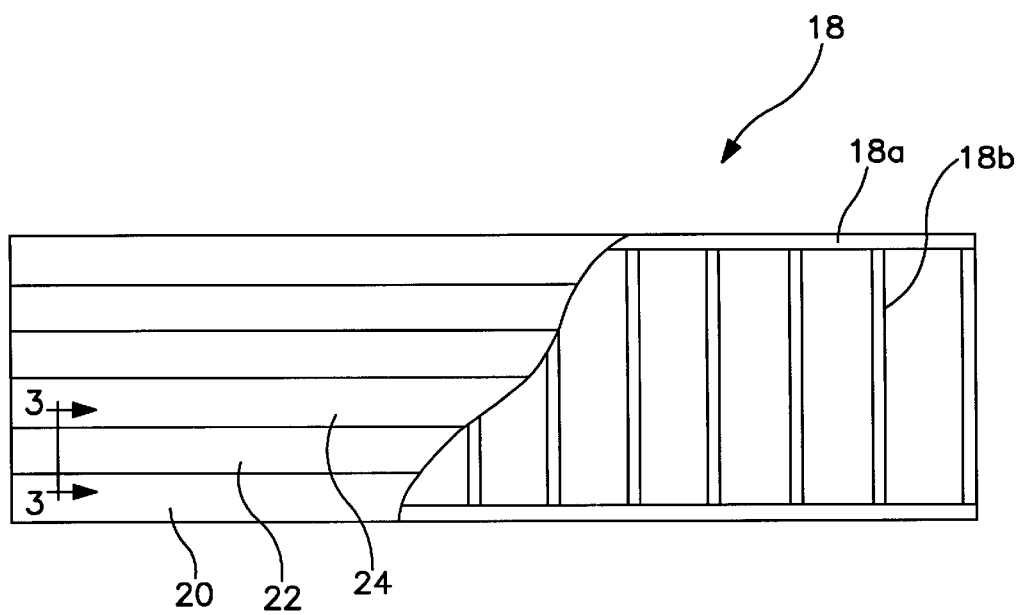
FIG. 2 is a plan view of a semi-trailer of the vehicle of FIG. 1.

FIG. 2 shows a plan view of the semi-trailer 12 and it has a substructure 18 including at least a pair of longitudinal frame members 18a and a plurality of cross members 18b extending between the frame members 18a. A number of flooring panels (three of which are shown at 20, 22 and 24) are fastened to the substructure 18.

Figure 3:
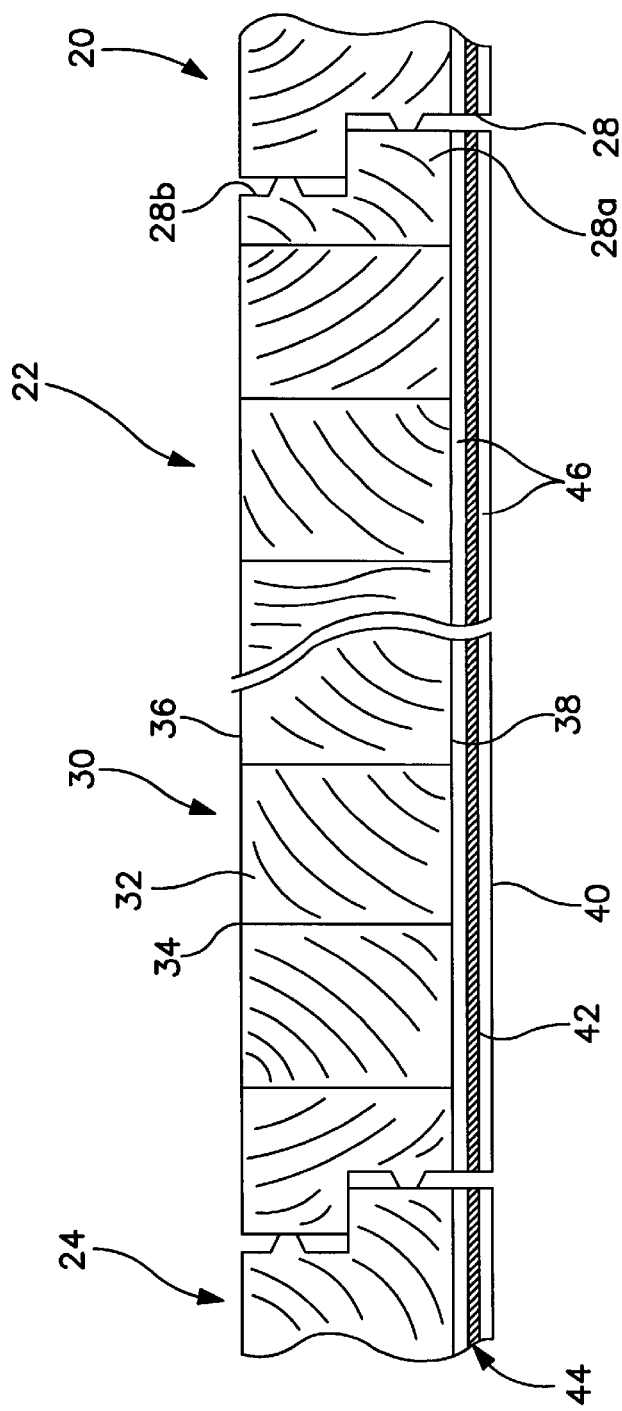
FIG. 3 is a sectional view taken on line 3—3 of FIG. 2.
Figure 4:
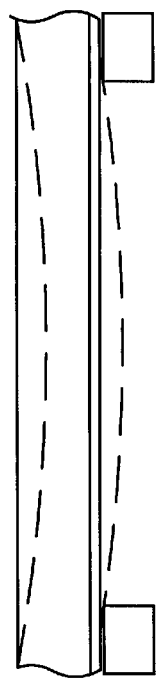
FIG. 4 is a side view of a panel illustrated in FIG. 3.

FIG. 3 shows more details of the flooring panels 20, 22 and 24. Each has at least one longitudinal edge region with a joint formation 28, which has a first projection 28a which, in this case, is relatively large and consumes roughly one half the thickness of the panel, on one half of the edge region thereof, and a second relatively small sealing projection 28b spaced from the first projection. As can be seen by FIG. 3, the first and second projections are offset from one another so that the smaller projection of panel 20 abuts the larger projection of panel 22 and so on. The edge region provides a method of joining or tying adjacent flooring panels together to strengthen the deck.

Looking more closely at the panel 22 shown in FIG. 3, it will be understood that the panel 22 has identical features of the panels 20 and 24 with the exception of the edge regions in some cases. For example, the remote longitudinal edge of the panel 20, in view of this location on the outermost edge of the substructure, may not need the edge region 28.

The flooring panel 22 has a wood core 30 having a plurality of strip elements 32 bonded together along substantially parallel bond surfaces 34. The wood core 30 has substantially planar upper and lower surfaces 36, 38 and a reinforced composite layer shown at 40 fixed to the lower surface, and which functions as a load support layer.

The load support layer 40 is capable of withstanding tensile loads and preferably has a plurality of tensile load reinforcement elements 42 which, in one example, are fibreglass strands, in a woven fibreglass sheet 44, for example a 24 ounce sheet. Desirably, the fibreglass sheet is embedded in an adhesive matrix 46. Preferably, the adhesive matrix has, as one of its constituents, a resilient material in a granulated form, such as synthetic rubber.

The strip elements may be selected from hardwoods such as oak, aspen, maple and birch. More particularly, the flooring panel 22 has the advantage that the last three of these hardwoods may be used. The flooring panel has the additional advantage that it can be made from selected softwoods, such as northern black spruce and northern white spruce, provided that it has sufficiently good mechanical properties, such as those outlined in Appendix One. Testing has shown that wood cores made from wood strip elements having a specific density ranging from about 0.39 to 0.65 have provided satisfactory results, although specific densities of greater than 0.65 may be used as well. In addition, wood elements used in the wood core may in fact be of different specific densities, in which case, the average specific density may desirably range from about 0.39 to about 0.65. In some cases, wood elements with lower specific densities may have otherwise satisfactory mechanical characteristics, such as a suitable tension and shear strength and torsional stiffness. It is important to bear in mind that the specific densities of a particular species of wood may vary depending on the region where the specifies is growing and is known to be influenced by changes in climate, soil type and the like.

Testing has shown that test strip elements having a specific density ranging from 0.35 to 0.65 should be useful in the present invention. For example, aspen has been found to have a specific density of about 0.40, while some birch species have specific densities of about 0.56, as compared with the oak species which have densities of about 0.60 and northern black spruce has a density of about 0.50. However, strip elements made from woods having other specific densities may also be useable in some cases, provided the mechanical properties are sufficient.

Figure 5A:
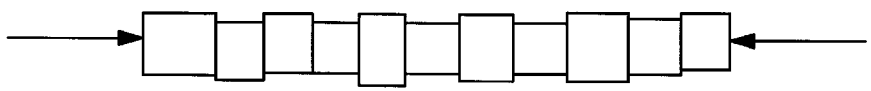
FIGS. 5a to 5e are successive views of a manufacturing process to form the panel of FIG. 4.
Figure 5B:
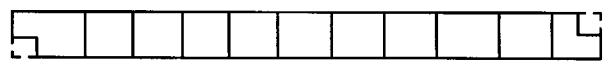

Referring to FIGS. 5a to 5e, the panel is formed as follows. Referring to FIG. 5a, the the wooden strip elements are first rough-planed (for example equipment providing the equivalent of 36 grit abrasive planer, in order to provide the strip elements with substantially parallel gluing surface. The strip elements are then kiln dried, coated with an adhesive resin and placed in a press, preferably a high frequency press, thereby to form the wood core. For example, the press may be an ultrasonic or radio frequency press which causes a localized frictional heating of the wood strip elements thereby to cure the resin and achieve a strong bond. A suitable adhesive is sold by ARCRESIN of Montreal Quebec and is suitably wet for the present application. In fact, testing of some flooring panels made according to the present technique has shown that the adhesive is sufficiently strong and has sufficiently penetrated the substrate of the wood core and the reinforcing material to the extent that the strength of the resulting bond appears to be greater than the strength of the substrate. Referring to FIG. 5b, the so-formed wood core is then rough-planed to form substantially planar upper and lower surfaces and the longitudinal edges are formed to form the edge regions as above described.

Figure 5C:
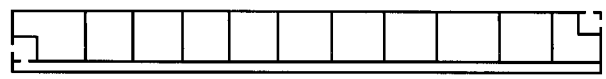
Figure 5D:
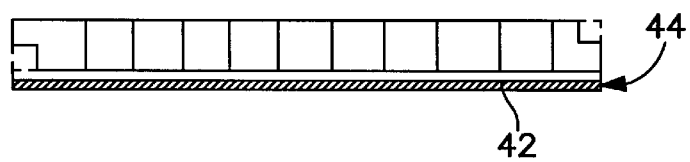
Figure 5E:
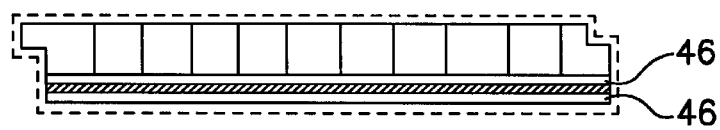

Referring to FIG. 5c, the lower edge is then coated with a first layer segment of an adhesive material, such as that sold under the trade name UNISEAL 204-Hard, Thin Film, sold by UNISEAL, Edmonton Alberta Canada, in a manner to ensure at least some penetrate of the adhesive into the substrate of the wood core. A second layer segment in the form of a sheet of woven fibreglass cloth, such as the type available from CORNING, is then placed on the first layer segment to allow the adhesive to wet the fibres of the reinforcing material, desirably minimizing air pockets therein. Referring to FIG. 5d, the facing surface of the fibreglass is then applied with a third layer segment of the same adhesive material. Referring to FIG. 5e, the first and third layer segments are then cured to form a matrix containing the fibreglass.

The adhesive used in the matrix holding the fibreglass should be sufficiently strong to maintain the adhesion of the load support layer on the wood core for the duration of its useful life. Preferable adhesives include those containing isocyanates capable of producing a wood-to-wood bond with a shear strength ranging from 1000 to 2200 psi. An example of a suitable adhesive is that sold under the trade name UNISEAL 204-Hard, Thin Film, by UNISEAL, Edmonton Alberta Canada. Other suitable adhesives may be those which exhibit one or more of the following properties, in their cured state:

Adhesion (to steel) Elcometer-1000 to 3000 psi;

Hardness: ASTM D-2240: 65 SHORE-D;

Flexibility: ASTM D-412: 45% Elongation;

Tensile Strength: 1800 to 3000 psi;

Salt Fog: 500 hrs. With no blistering of Undercutting

UV Resistance: 500 hours. QVU, slight yellowing and chalking (properties intact)

Referring to FIG. 5e once again, the resulting panel is then enveloped in an exterior coating, that is a coating which covers substantially the entire outer surface of the panel and this coating can be selected from such coatings as polyurethanes and the like, depending on the environment in which the so-equipped semi-trailer may be exposed. For example, a flat deck trailer flooring panel may be coated with an anti-slip compound, such those which contain a UV inhibitor and a granular material, for example those sold under the trade name CHEMCRAFT.

The fibreglass contributes to the downward bending strength of the panel, since the bending of the panel places the fibreglass cloth in tension, which, as is known to those skilled in the art, has high tensile load limits. The use of the load support layer therefore allows the wood core to be thinner than the wood cores used in some conventional semi-trailer vehicle flooring. While providing substantially the same strength. For example, conventional flooring has a thickness of 1⅛ inch and 1⅜ inch, while the present flooring may be, if desired, be 1¹⁄₁₆ inch. Meanwhile, the specific density may be, if desired, reduced to levels of about 0.35 for example, rather than the conventional specific density of 0.60 when oak is used. Moreover, a thinner wood core results in a lower 'deadweight'. The use of the load support layer may, in some cases, allow the hardwoods selected for the wood core to a lower density, thereby lowering the 'deadweight' still further and reducing cost, since such lower density hardwoods are more plentiful.

Testing was carried our examples of the present flooring panel according to the specifications of Appendix One, the results of which are shown in tables 1 to 10. These specifications were established by PULLMAN TRAILMOBILE, a Division of PULLMAN, and define the standards for flooring panels used on semi-trailers. Samples of the present flooring panel, using a maple wood core, were tested under this standard, the results of which are shown in Tables 1 and 2. It can be seen that the samples were capable of withstanding mean shear loads of 6302 psi and 7289 psi respectively. Samples of the present flooring panel, using an aspen, oak and birch are shown Tables 3 to 10.

The useful life of a flooring panel is conventionally compared by the trucking industry with test which is known in the field as a Dynamic Cycling Test and currently conducted by the manufacturer GREAT DANE, were a test bed is formed from a steel trailer frame and the test flooring panels are mounted on the frame to form a test payload-receiving deck. A test device, roughly equivalent to a small forklift truck which is loaded with ballast of about 10,000 pounds, is then programmed to travel back and forth along a 10 foot path front and back on the test payload receiving deck. It, is generally held that a sample floor will pass the test if it can remain intact for 15,000 cycles of the test device, with a moderate level of delamination along the glue surfaces. This 15,000 cycle test is considered equivalent to a 15 year test. In tests carried out on selected test samples of the present flooring panel have withstood as many as 27,000 cycles with minimal delamination.

To assemble the semi-trailer vehicle flooring, a number of flooring panels 20, 22 and 24 are placed on the substructure and fastened in place. In so doing, the edge region of panel 20 is placed alongside the edge region of panel 22 and so on and the panels are preferably pressed together in order to force each of the small projections into its neighboring large projection. This arrangement is beneficial because during use, moisture appearing at the small/large projection interface will cause local swelling, which in turn will increase the compressive forces between the large and small projections and the wood in this localized area expands. The water, however, is restricted to a very small area surrounding the edge regions and is not able to penetrate the polyurethane coating envelope, to affect the bond lines of the panels themselves. It should be understood, however, that the exterior coating envelope otherwise minimizes water penetration into the wood core.

Thus, the flooring panel 20 may be used in some cases to reduce the deadweight of a semi-trailer as well as, in some cases, to improve the useful life of trailer decks formed with it. The flooring panel 20 makes use of horizontally laminated woven fibreglass sheet on the underside of the flooring panel by way of an adhesive compound having a mixture of granulated or crumb rubber and a resin which may include one or more of isocyanate and polyurethane, such as that sold under the trade name UNISEAL. The flooring panel 20 may be used with selected hardwoods and softwoods having specific densities ranging from 0.35 to 0.60, for example hardwoods such as aspen (at 0.40), and birch (at 0.56) or maple (at 0.61), or softwoods as northern black spruce at (0.50) for the wood core. If desired, a second woven fibreglass layer may also be applied to the upper surface of the wood core and coated with such things as anti-slip coatings, and the like or those which provide increased wear resistance, for example.

The flooring panel may, in some cases, increase the longevity of the so-formed deck by maintaining the integrity of the wood core for a longer period of time, by providing one or more of superior adhesion, relatively high tensile strength, relatively high UV ray resistance, relatively low porosity, relatively high impact resistance and corrosion resistance. Depending on the specific dimensions of the wood core, the density of the wood elements, for example, the flooring panel should in some cases be able to contribute to an overall reduction in deadweight by 200 to 700 pounds when compared with conventional hardwood flooring panels, thereby increasing the payload while reducing fuel and maintenance costs.

While the flooring panel described herein utilizes fibreglass as a reinforcing material in the load support layer, other materials may be used, such as carbon fibres, or polymer fibres such as polyester, and the like, which are held in a suitable matrix. While the flooring panel has been described in the context of a tractor trailer vehicle, it will be understood that the flooring panel may also be useful in other vehicles such as fixed body transport trucks and the like. Other modifications may also be made to the embodiments presented herein while not departing from the scope of the claims which follow.

What is claimed is:

1. A flooring panel for a transport vehicle, comprising a wood core, said wood core including a plurality of wooden strip elements bonded together and having a top surface and a bottom surface, reinforced composite layer applied to at least one of said top surface or said bottom surface, and an exterior polymeric coating envelope substantially covering an entire outer surface of the panel, whereby water penetration is inhibited.

2. The flooring panel as defined in claim 1 wherein the wood core has an average specific density ranging from 0.40 to 0.59.

3. The flooring panel as defined in claim 1 wherein substantially the entire area of at least one of said top surface or said bottom surface is continuously bonded to said composite layer.

4. The flooring panel as defined in claim 1 wherein said composite layer including a fibreglass sheet embedded in an adhesive matrix.

5. The flooring panel as defined in claim 4 wherein said matrix includes a resilient material in a granulated form.

6. The flooring panel as defined in claim 5 wherein said resilient material is synthetic rubber.

7. The flooring panel as defined in claim 1, further comprising a protective coating applied to said wood core.

8. The flooring panel as defined in claim 7 wherein said protective coating envelopes said wood core together with said composite layer.

9. The flooring panel as defined in claim 8 wherein said protective coating includes polyurethane materials.

10. The flooring panel as defined in claim 1, wherein the polymeric coating envelope penetrates said top surface of said wood core for reinforcing the bond between the envelope and said wood core to facilitate wear resistance.

11. The flooring panel as described in claim 10 further comprising a granular material included in said envelope for providing an anti-slip surface on said top surface.

12. The flooring panel as described in claim 11, wherein said granular material is selected from the group comprising granulated rubber, crumb rubber, and synthetic rubber.

13. The flooring panel as described in claim 12 further comprising a UV inhibitor included in said envelope.

14. The flooring panel as described in claim 1, wherein said envelope contains polyurethane.

15. The flooring panel as described in claim 1, wherein said envelope includes an isocyanate constituent.

16. The flooring panel as described in claim 1, wherein said envelope includes a hardening constituent to harden said top surface.

17. A flooring panel for a transport vehicle, the flooring panel comprising:

(a) a wood core including a plurality of wooden strip elements bonded together, said wood core having a top surface and a bottom surface;

(b) an exterior polymeric coating envelope substantially covering said top surface; and (c) a granular constituent in the envelope for providing an anti-slip surface on said top surface, whereby water penetration into said wood core through said top surface is inhibited.

18. A transport vehicle having a payload receiving deck including at least one flooring panel, a flooring panel including:

(a) a wood core including a plurality of wooden strip elements bonded together, said wood core having a top surface and a bottom surface;

(b) an exterior polymeric coating envelope substantially covering said top surface; and (c) a granular constituent in the envelope for providing an anti-slip surface on said top surface, whereby water penetration into said wood core through said top surface is inhibited.

19. A transport vehicle having a payload receiving deck including at least one flooring panel, the flooring panel including:

(a) a wood core including a plurality of wooden strip elements bonded together, said wood core having a top surface and a bottom surface;

(b) an exterior polymeric coating envelope substantially covering said top surface; and (c) said penetration constituent in the envelope for penetrating said top surface of said wood core top reinforce the bond between the envelope and said wood core, whereby a wear-resistant surface on said top surface is provided and water penetration into said wood core through said top surface is inhibited.

* * * * *